United States Patent

Bierlein et al.

[15] 3,705,753
[45] Dec. 12, 1972

[54] METHOD AND MEANS FOR REDUCING FRETTING OF CONTACTING SURFACES

[72] Inventors: John C. Bierlein, Royal Oak; Arnold O. DeHart, Rochester; Louis W. Handwerker, Jr., Detroit, all of Mich.

[73] Assignee: General Motors Corporation, Detroit, Mich.

[22] Filed: Aug. 3, 1970

[21] Appl. No.: 60,260

[52] U.S. Cl. ............................308/240, 184/1 R
[51] Int. Cl. .............................................F16c 9/04
[58] Field of Search ..............308/240, 237; 184/1 R

[56] References Cited

UNITED STATES PATENTS

| | | | |
|---|---|---|---|
| 771,500 | 10/1904 | Stiles | 308/240 X |
| 1,236,511 | 8/1917 | Waring | 308/240 |
| 1,512,190 | 10/1924 | Barnes | 308/240 |
| 1,674,453 | 6/1928 | Sloper | 308/240 |
| 1,923,514 | 8/1933 | Stockfleth | 308/240 |
| 1,947,023 | 2/1934 | Shoemaker | 308/240 X |
| 2,106,860 | 2/1938 | Tibbetts | 308/240 |
| 2,905,511 | 9/1959 | Cerness | 308/237 |

FOREIGN PATENTS OR APPLICATIONS

| | | | |
|---|---|---|---|
| 603,761 | 1/1926 | France | 308/240 |

OTHER PUBLICATIONS

Product Engineering, July, 1942, page 380.

*Primary Examiner*—Martin P. Schwadron
*Assistant Examiner*—Barry Grossman
*Attorney*—J. L. Carpenter and Robert J. Outland

[57] ABSTRACT

In a preferred embodiment, a journal bearing insert and its retainer have contacting cylindrical surfaces which are maintained in substantially fixed engagement but subject to variable loads, causing repetitive slight relative movement of the surfaces under pressure. Lubrication is provided to reduce fretting of the surfaces through a latticework of interconnected closely spaced grooves on the order of 10.001 inches deep, which may be etched or otherwise formed over the exterior surface of the insert on the interior surface of the retainer.

5 Claims, 5 Drawing Figures

PATENTED DEC 12 1972 3,705,753

INVENTORS
John C. Bierlein,
Arnold O. DeHart, &
Louis W. Handwerker, Jr.
BY Robert J. Outland
ATTORNEY

METHOD AND MEANS FOR REDUCING FRETTING OF CONTACTING SURFACES

BACKGROUND OF THE INVENTION

This invention relates to the reduction of fretting in the contacting portions of metal members retained together in substantially fixed engagement but subject to localized repetitive slight relative movement under pressure. In certain of its more specific aspects, the invention relates to journal bearings and the reduction of fretting between bearing inserts and their retainers.

In the eighth edition of the Metals Handbook, published by the American Society for Metals (1961), fretting is defined as "action that results in surface damage, especially in a corrosive environment, when there is relative motion between solid surfaces in contact under pressure." While the action of fretting is far from being fully understood, it is believed that it results when localized motion of contacting surfaces scrapes these surfaces so clean that they weld together, causing adjoining portions of the metal members to be torn apart by the continued relative motion. This action occurs with respect to many types of parts in which slight relative motion under pressure is permitted while the parts appear to be securely fastened or otherwise maintained fixed together.

This is particularly true of journal bearings where it is common to use a split bushing as a bearing and retain it by clamping within a retainer, such as the crankshaft supporting web and bearing cap of an engine cylinder block, or the connecting rod and mating cap of an engine. In these constructions, fretting sometimes occurs between the backs of the bearing inserts and the cylindrical inner surfaces of the bearing retainer members due to the constantly changing force and angularity of the loads applied to these bearing inserts by the associated journals. Such fretting can be very serious since it may increase the stresses in the metal adjacent the distressed area and has been known to actually cause failure by breaking of connecting rods and other similar components.

Among other examples of locations where fretting may occur are included the engaging surfaces of bearing caps and their associated members, such as connecting rods and cylinder blocks; the contacting surfaces of a piston pin and connecting rod when the two are bolted together in fixed positions; the engaging surfaces of tight splined connections of rotating shaft and the like, where little end motion is involved; and other similar applications.

SUMMARY OF THE INVENTION

The present invention provides a means and method whereby the fretting of contacting metal parts can be substantially reduced or completely eliminated by providing for the introduction of lubricant between contacting surfaces maintained in substantially fixed engagement under pressure but wherein repetitive slight relative movement movement may occur. This is accomplished by providing a grid or latticework of shallow, closely spaced grooves on one of the two surfaces, the grooves extending to the edges of the contacting portions, and then providing for a supply of oil or other suitable liquid lubricant to reach these edges so that it may enter the grooves and be distributed therealong. The grid is preferably made up of grooves on the order of 0.001 inches deep and spaced with a density of 20 lines or more per inch in each direction so that the contacting portions of the mating surfaces are divided into a large number of small spaced contacting surfaces, the edges of which are supplied with oil through the interconnecting grooves. With this arrangement, it is believed that the oil seeps between the small individual contacting surfaces and provides a sufficient barrier to prevent the welding action which is apart of the fretting mechanism.

These and other advantages of the invention will be more clearly understood from the following description of a preferred embodiment, taken together with the accompanying drawing.

DESCRIPTION OF THE PREFERRED Embodiments

Figure 1:
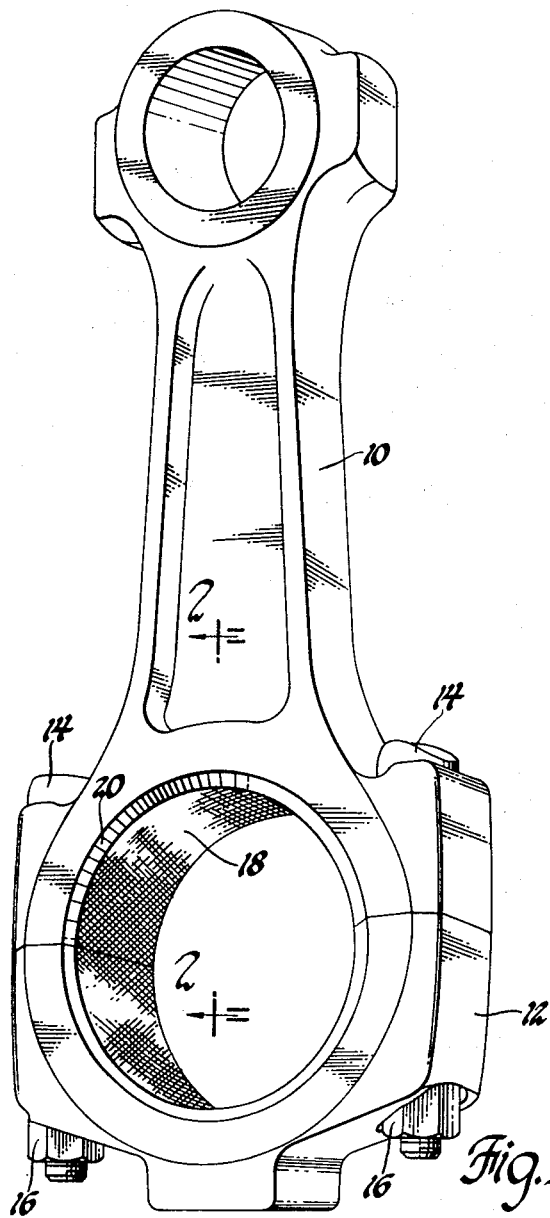
FIG. 1 is a pictorial view of an engine connecting rod having a cylindrical bearing receiving surface provided with lubricant distributing grooves in accordance with the invention.
Figure 2:
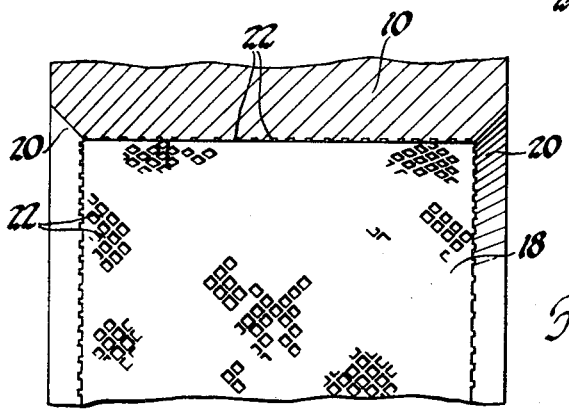
FIG. 2 is an enlarged cross-sectional view taken in the plane indicated by the line 2—2 of FIG. 1 and showing the grooved surface.

Referring first to FIGS. 1 and 2 of the drawings, there is shown a connecting rod 10 for an internal combustion engine or the like, having a separable cap portion 12 secured in place by conventional bolt and nut means 14, 16. Internally of the rod and cap 10, 12 there is provided a cylindrical interior surface 18 within which a two-piece cylindrical bearing insert is to be clamped for installation in an engine. Chamfers 20 are provided at the edges of the cylindrical surface 18.

The complete interior surface 18 of the rod is divided up by a grid or latticework of grooves 22 arranged in a criss-cross pattern. These grooves may be formed by photo-etching the surface, by electro-mechanical machining, by mechanical rolling or by any other suitable method and, preferably, have a depth on the order of 0.001 inches so as not to significantly reduce the strength of the connecting rod itself. The grooves are preferably spaced with a density of at least 20 grooves per inch so that the interior surface is divided into small rectangular contact surfaces averaging less than 0.0025 square inches or 0.05 inches square. During tests, particularly good results have been obtained with a 32 by 32 grooves per inch criss-cross grid pattern with grooves of about 0.001 inches deep and sufficiently wide to occupy about 50 percent of the gridded area. It should be recognized, however, that the grooves may be of any desired depth and may be made wider or narrower, as permitted by the mechanics of the loads placed on the contacting surfaces and by the requirement that the grooves be capable of distributing therealong lubricating oil introduced along the edges of surface 18 at the chamfers 20.

With the foregoing construction, the installation of a smooth backed bearing insert in place within the connecting rod opening will provide a plurality of points at which the small contacting surfaces making up the inner surface 18 of the connecting rod are in substantially fixed engagement with the smooth exterior surface of the insert bearing (not shown). These points of contact are separated by the various interconnecting grooves 22 so that oil may be distributed through this network to the edges of all the contacting surfaces and, to the extent possible, will seep between these surfaces to protect them from fretting during operation of the engine.

Figure 3:
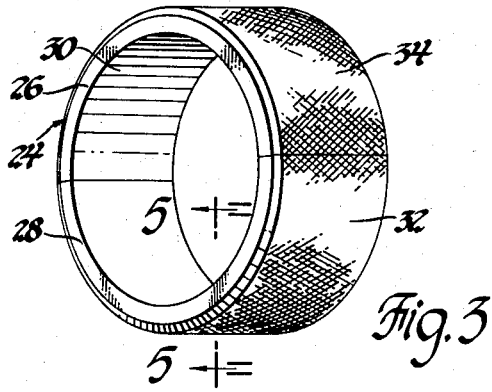
FIG. 3 is a pictorial view of a split bearing insert for a journal bearing or the like, having the exterior surface provided with oil distributing grooves according to the invention.
Figure 4:
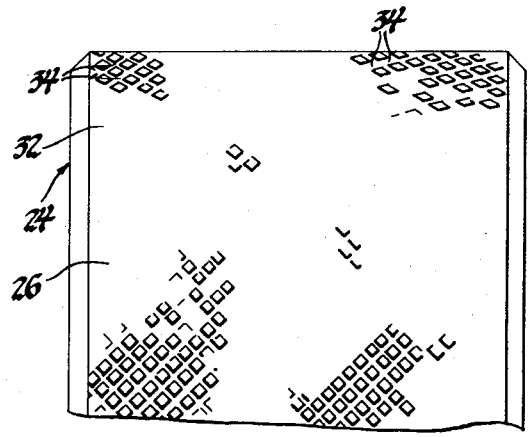
FIG. 4 is an enlarged view of a portion of the exterior surface of the bearing insert of FIG. 3.
Figure 5:
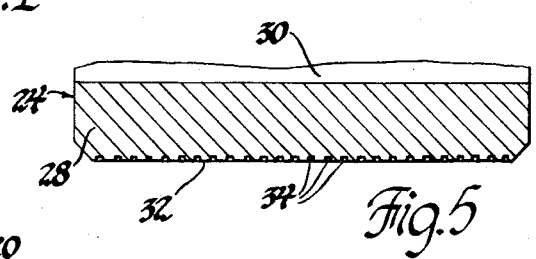
FIG. 5 is a cross-sectional view taken generally in the plane indicated by the line 5—5 of FIG. 3.

Referring now to FIGS. 3 through 5 of the drawing, there is shown an insert bearing 24 having two semi-circular halves 26, 28, which are adapted to be clamped within bearing retaining means, such as, for example, a connecting rod like that of FIGS. 1 and 2 but without the grooves in surface 18. Bearing 24 includes an interior cylindrical surface 30, which is adapted to engage a journal of a crankshaft or the like and to be supplied with lubricant for relative rotation with respect to the crankshaft. The bearing 24 also includes a cylindrical exterior surface 32, which is adapted to be clamped within a mating interior surface of the bearing retaining means so that the two surfaces are maintained substantially fixed together but are subject to varying repetetive loads which may cause a slight relative motion of the surfaces under pressure.

To prevent or reduce the possibility of fretting of the surface 32 and its mating surface, there is provided an interconnected grid or latticework of grooves 34 which extend over the complete surface 32 in the same manner as the grooves 22 extend over the surface 18 of the connecting rod of FIGS. 1 and 2. These grooves have the same purpose as grooves 22 of the connecting rod and are characterized by the same requirements with respect to size and density.

It is apparent from the above described embodiments that the latticework of grooves provided for distributing oil or other liquid lubricant intermediate the contacting surfaces of two engaging parts maintained under varying pressures may be provided in either of the parts. It should also be noted that the grooves could alternatively be arranged some in each of the parts so that in interconnecting latticework is formed when the parts are placed in engagement. For example, a group of parallel grooves could be disposed along one of the surfaces with a perpendicularly disposed group of parallel grooves being arranged along the other of the surfaces so that when the two surfaces are placed in engagement, the required interconnecting latticework of grooves will be provided.

While the invention has been described by reference to specific embodiments relating to bearings and connecting rods, it should be obvious that the method and means disclosed for reducing or preventing fretting may be applied to any comparable arrangement of members which are secured together under load and subject to slight repetitive motion which is apt to cause fretting. All that is required is that liquid lubricant be made available to the edges of the surfaces where it may enter the interconnecting grooves for distribution therealong. The lubricant may be supplied by special means or may be present in the atmosphere during normal operation of the mechanism involved, so long as it is made available to the contacting parts. These and such other applications and modifications as may be made by those skilled in the art, without departing from the spirit and scope of the inventive concept disclosed, should be considered as included in our invention as defined by the following claims.

We claim:

1. In combination, a pair of non-porous metal members having mating surfaces, said members being secured together with said surfaces in substantially fixed engagement but subject to forces causing localized repetitive slight relative movement under pressure of said surfaces against one another, a latticework of interconnected grooves provided on one of said surfaces and dividing the contacting areas of said surfaces into a plurality of small spaced contacting surfaces, each having an area of less than 0.0025 square inches, said grooves being of sufficient depth and width to distribute liquid lubricant to the edges of said contacting surfaces, whereby liquid lubricant delivered to said grooves may be distributed to the edges of said spaced contacting surfaces and seep therebetween to provide an effective deterrent to fretting of said mating surfaces.

2. In a journal bearing arrangement, a bearing retaining member having a cylindrical inner surface, a bearing insert member having a cylindrical outer surface, means for retaining said insert member within said retaining member with said inner and outer surfaces in substantially fixed engagement, said retaining means permitting localized slight relative movement under pressure of said surfaces against one another due to variable loading of said bearing insert by an engaging journal, and a latticework of interconnected grooves provided on one of said surfaces and dividing the engaging portions of said surfaces into a plurality of small spaced contacting surfaces, each having an area of less than 0.0025 square inches, said grooves being of sufficient depth and width to distribute liquid lubricant to the edges of said contacting surfaces, whereby liquid lubricant delivered to said grooves may be distributed to the edges of said spaced contacting surfaces and seep therebetween to provide an effective deterrant to fretting of said inner and outer surfaces.

3. The bearing arrangement of claim 2 wherein said grooves have a depth on the order of 0.001 inches and comprise a criss-cross pattern of parallel grooves spaced along said one surface with a density of not less than 20 grooves per inch in each direction of the pattern.

4 The method of preventing or reducing fretting of the mating surfaces of two non-porous metal parts maintained together in substantially fixed engagement but subject to localized repetetive slight relative motion under pressure, said method comprising the steps of providing a latticework of interconnected grooves between the two surfaces, said grooves separating the contacting areas of said surfaces into a plurality of small spaced contacting surfaces, each having an area of less than 0.0025 square inches, said grooves being of sufficient depth and width to distribute liquid lubricant to the edges of said contacting surfaces and providing a supply of liquid lubricant to said grooves.

5. The method of claim 4 wherein said grooves are provided entirely in one of said parts and are arranged in a criss-cross pattern of parallel grooves, each of said grooves extending to the edge of the respective surface of said one part, and said step of providing a supply of lubricant is accomplished by maintaining said parts in a lubricant containing atmosphere.

* * * * *